United States Patent [19]

Tarao et al.

[11] 4,239,865
[45] Dec. 16, 1980

[54] POLYVINYL (DIALKYLTHIOCARBAMOYLTHIO)ACETATE RESIN, METHOD FOR PRODUCING SAME AND HEAVY METALS-REMOVING AGENT COMPRISING SAME

[75] Inventors: Ryohkichi Tarao, Yokosukashi; Kanji Kaku, Yokohamashi; Masaki Hayashi, Yokohamashi; Takao Nakamura, Yokohamashi; Shigeo Ohishi, Funabashishi, all of Japan

[73] Assignee: Chisso Corporation, Osaka, Japan

[21] Appl. No.: 849,923

[22] Filed: Nov. 9, 1977

[30] Foreign Application Priority Data

Nov. 17, 1976 [JP] Japan .................... 51/137984

[51] Int. Cl.³ .................... C08F 8/34; C02B 1/42
[52] U.S. Cl. .................... 525/327; 210/688; 252/180; 525/352; 526/288
[58] Field of Search .................... 260/79.7, 79.5 C; 526/30, 14, 39, 288; 525/327, 352; 252/180; 210/38 B

[56] References Cited

U.S. PATENT DOCUMENTS

| 2,274,616 | 2/1942 | Raynolds | 526/39 X |
| 2,388,169 | 10/1945 | McAlevy | 526/39 X |

FOREIGN PATENT DOCUMENTS

| 49-14315 | 2/1974 | Japan | 260/79.7 |
| 50-29481 | 3/1975 | Japan | 260/79.7 |
| 50-36367 | 4/1975 | Japan | 260/79.7 |

Primary Examiner—C. A. Henderson
Attorney, Agent, or Firm—Fred Philpitt

[57] ABSTRACT

A new polyvinyl(dialkylthiocarbamoylthio)acetate resin expressed by the formula

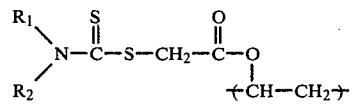

(wherein $R_1$ and $R_2$ each represent hydrogen atom or an alkyl group of $C_1$-$C_5$) is provided.

Said resin has a superior heavy metals-removing performance and is insoluble in organic solvents and hence very useful as an agent for removing heavy metals.

Said resin is prepared by reacting a tetraalkylthiuramdisulfide expressed by a formula

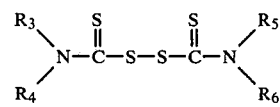

(wherein $R_3$, $R_4$, $R_5$ and $R_6$ each represent hydrogen atom or an alkyl group of $C_1$-$C_5$) with a vinyl acetate polymer on heating in a solvent.

Said resin is used as an agent for removing heavy metals, alone or in admixture with an auxiliary agent such as active carbon.

10 Claims, No Drawings

POLYVINYL (DIALKYLTHIOCARBAMOYLTHIO)ACETATE RESIN, METHOD FOR PRODUCING SAME AND HEAVY METALS-REMOVING AGENT COMPRISING SAME

BACKGROUND OF THE INVENTION

The present invention relates to a new polyvinyl(dialkylthiocarbamoylthio)acetate resin, a method for producing said resin and a heavy metals-removing agent which utilizes the heavy metals-seizing property of said resin.

Recently, nuisances brought by waste water, exhaust gases, commercially discarded materials, etc. have caused public discussion. Particularly, the problem of treatment of waste water containing heavy metals such as mercury, etc. has been serious. Thus, the administrative regulation of drainage has become severer year after year. For example, in case of mercury, 5 ppb has been required as its effluent standard, and 0.5 ppb, as its environmental quality standard.

As a countermeasure to this, a compound capable of seizing mercury contained in waste water by forming a chelate bond with mercury compounds has been found. For example, Japanese patent application laid-open No. 29481/1975 discloses a mercury-removing performance of tetraalkylthiuramdisulfide. However, when this compound is employed as an agent for removing mercury, the presence of oily matters, organic substances, etc. in admixture with the waste water, brings about the drawbacks that the tetraalkylthiuramdisulfide is extracted by oily matters, and also its mercury-removing performance is only to such an extent that a mercury ion concentration of 1 ppm is reduced down to 0.011–0.0042 ppm, such values being much insufficient as compared to the above-mentioned standard values.

The present inventors have made strenuous studies for overcoming these drawbacks, and as a result have found a polyvinyl(dialkylthiocarbamoylthio)acetate resin having advantages of a mercury-removing performance which has never been known, and its insolubility in organic substances, and have succeeded in producing said resin.

SUMMARY OF THE INVENTION

A first object of the present invention is to provide a new substance having properties of seizing heavy metals and being insoluble in organic substances.

A second object thereof is to provide a method for producing said new substance.

A third object thereof is to provide an agent for removing heavy metals.

The new substance of the present invention is characterized by a polyvinyl(dialkylthiocarbamoylthio)acetate resin which is a polymer having a unit expressed by the following formula

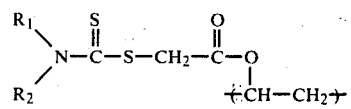

(wherein $R_1$ and $R_2$ each represent hydrocarbon atom or an alkyl of $C_1$–$C_5$) and the method for producing the above-mentioned resin is characterized by heating a tetraalkylthiuramdisulfide expressed by a general formula

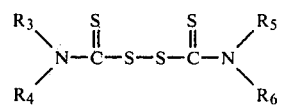

(wherein $R_3$, $R_4$, $R_5$ and $R_6$ each represent hydrogen atom or an alkyl group of $C_1$–$C_5$) together with a vinyl acetate polymer.

Further the resin of the present invention can be used as an agent for removing heavy metals, singly or in admixture with an auxiliary agent such as active carbon.

DETAILED DESCRIPTION OF PREFERRED EMBODIMENTS

The polyvinyl(dialkylthiocarbamoylthio)acetate resin referred to herein is a homopolymer or copolymer of vinyl(dialkylthiocarbamoylthio)acetate having a unit expressed by a formula

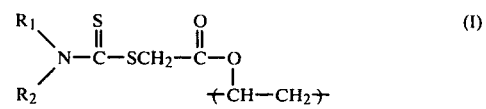

(wherein $R_1$ and $R_2$ each represent hydrogen atom or an alkyl group of $C_1$–$C_5$) and more particularly a reaction product of a vinyl acetate polymer obtained by homopolymerization or copolymerization of vinyl acetate, with a tetraalkylthiuramdisulfide expressed by a general formula

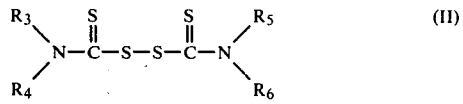

(wherein $R_3$, $R_4$, $R_5$ and $R_6$ each are hydrogen atom or an alkyl group of $C_1$–$C_5$) which is a substance insoluble in water or benzene and having a heavy metals-seizing property. For example, polyvinyl(dimethylthiocarbamoylthio)acetate, polyvinyl(diethylthiocarbamoylthio)acetate, ethylene-vinyl(dimethylthiocarbamoylthio)acetate copolymer and ethylene-vinyl(diethylthiocarbamoylthio)acetate copolymer can be illustrated.

The infrared absorption spectra of the resin of the present invention are nearly similar to those wherein the absorption bands of the tetraalkylthiuramdisulfide is overlaid over the bands of the vinyl acetate polymer. However, the intensity ratios of the respective absorption bands change from the values of both the substances, and also a part of the overlaid absorption bands disappears and there appear new absorption bands. For example, in case of polyvinyl(dimethylthiocarbamoylthio)acetate which is a reaction product of tetramethylthiuramdisulfide with polyvinyl acetate, the notable absorption band at 850 cm$^{-1}$, of tetramethylthiuramdisulfide disappears, while the absorption bands appear at 1100, 980, 890 and 880 (cm$^{-1}$). Further, in case of polyvinyl(diethylthiocarbamoylthio)acetate which is a reaction product of tetraethylthiuramdisulfide with polyvinyl acetate, the intensity ratios of the absorption bands originated from the three absorption bands at 1502 cm$^{-1}$ (s), 1453 cm$^{-1}$ (m) and 1420 cm$^{-1}$ (s), of tetraethylthiuramdisulfide become 1503 cm$^{-1}$ (s), 1455 cm$^{-1}$ (w) and 1425 cm$^{-1}$ (s), and the band corresponding to 1453 cm$^{-1}$ (m) becomes very small.

The method for producing the resin of the present invention is characterized, as mentioned above, by heating a tetraalkylthiuramdisulfide expressed by the general formula (II) together with a vinyl acetate polymer obtained by homopolymerization or copolymerization of vinyl acetate, in a solvent. Although there is no particular limitation as to the solvent, water is preferable, and as for the temperature at which heating and reaction are carried out, a range of 90°–140° C. is suitable. In the reaction, although the reaction ratio by mol of a tetraalkylthiuramdisulfide to a vinyl acetate polymer can be optionally selected, a preferable range of the ratio is 0.01–1 mol of the tetraalkylthiuramdisulfide to one mol of the vinyl acetate polymer (as calculated from vinyl acetate monomer). If the ratio is outside the above-mentioned range, there occur such drawbacks that the separation of unreacted materials after the reaction is difficult or the reaction time is prolonged. Although the time required for the reaction varies depending upon the reaction temperature or the mol ratio of both the raw materials, for example, if the reaction temperature is 100° C. and a mol ratio of a vinyl acetate polymer to a tetraalkylthiuramdisulfide of 2:1 is selected, 10 hours are sufficient. After the reaction, unreacted materials are removed to give a polyvinyl(dialkylthiocarbamoylthio)acetate.

The tetraalkylthiuramdisulfide employed in the method for producing the resin, of the present invention is those expressed by the formula (II), for example, bisdiethylthiocarbamoyldisulfide, bisdimethylthiocarbamoyldisulfide, etc. can be mentioned. The vinyl acetate polymer referred to herein also includes, in addition to the homopolymer of vinyl acetate, copolymers composed mainly of vinyl acetate and containing another kind of vinyl monomer, and as for such another kind of vinyl monomer, vinyl butyrate, ethylene, acrylic acid, acrylic esters, fumaric acid, crotonic acid, and the like are mentioned. As for the form of the vinyl acetate polymer to be subjected to the reaction with a tetraalkylthiuramdisulfide, any form such as emulsion, methanol solution, etc. can be employed, but emulsion form is particularly advantageous in that it is easy to separate the main component after the reaction.

The agent for removing heavy metals, of the present invention is characterized by comprising a polyvinyl(dialkylthiocarbamoylthio)acetate resin also of the present invention which is a polymer having a repetition unit expressed by said formula (I), as mentioned above. As for the resin as said removing agent, although many of the resins can be employed so long as they are the resin of the present invention, a resin which is a reaction product of a vinyl acetate polymer with a tetraalkylthiuramdisulfide is preferable. Further, as for the agent for removing heavy metals, of the present invention, although said resin of the present invention can be employed alone, a mixture of said resin with an appropriately selected auxiliary agent is preferably employed, and as for such an auxiliary agent, active carbon, bone charcoal, finely divided coal and extender can be mentioned. Among them, it is preferable to mix powdered active carbon, and as for the mixing ratio, a range of ratio by weight based on said resin, of 10:1–1:10 is preferable.

As for the preparation of the agent for removing heavy metals, of the present invention, the resin of the present invention may be mixed with an auxiliary agent in a usual manner, but, when a tetraalkylthiuramdisulfide is reacted with a vinyl acetate polymer in the method for producing the resin of the present invention, it is also possible to carry out the reaction in the coexistence of an auxiliary agent such as active carbon, and thereafter remove a solvent employed in the reaction to obtain an agent, for removing heavy metals.

The resin of the present invention has such specific features that it has a structure wherein a dialkylthiocarbamoyl group is combined to a high molecular weight chain by the medium of sulfur atom, it is insoluble in organic solvents such as benzene or the like and it has a heavy metal-seizing property. This is presumed to be due to the fact that a hydrolytic ester bond is present near to the alkylthiocarbamoyl group, and makes easy the access of the ion of heavy metals such as mercury being dissolved in water, to the dialkylthiocarbamoyl group. Further, since the dialkylthiocarbamoyl group having a performance for seizing heavy metals such as mercury is in the state like the group is fixed onto a carrier, the resin is suitable for removing heavy metals contained in waste water, and also since the resin is insoluble in organic substances such as benzene and water, there is no drawback of flowing out. Thus the resin is a useful substance which is provided with properties suitable for commercial uses and has never been known.

As for the method for producing the resin of the present invention, it is not necessary to particularly purify the raw materials, but a mere heating may be sufficient, and particularly when water is employed as a solvent, the method is suitable for controlling the reaction temperature and also for separating the resulting resin, and hence safe and commercially advantageous.

The specific features of the agent for removing heavy metals, of the present invention are as follows: the agent has made use of the heavy metals-seizing characteristic of the new resin of the present invention; it has a superior heavy metals-removing performance to the conventional agents for removing heavy metals; and also it has such superior functions that it reacts directly and readily with heavy metals contained in aqueous solutions; its heavy metals-adsorbing rate is very high; the agent itself and the agent having heavy metals adsorbed do not dissolve away into liquids; etc. Among the agents for removing heavy metals, of the present invention, the agent obtained by mixing the resin of the present invention with powdered active carbon has a high performance for removing mercury among heavy metals, and by employing this agent for waste water treatment, waste water having values lower than those of the environmental standards can be obtained. Although a correct theoretical explanation as to the fact that the mercury-removing performance is further improved by mixing the resin of the present invention with active carbon cannot be made, it is presumed that the fact that the mixture exhibits a notably superior adsorption performance at the time of its use, to that anticipated from the addition effect brought by the respective adsorption performances of the resin and powdered active carbon prior to the mixing thereof, indicates that the interaction between mercury ion and the surface of the reaction product is physically promoted by the medium of powdered active carbon.

As for the using manner of the agent for removing heavy metals, of the present invention, any manner can be employed. For example, a method wherein said removing agent is introduced in the form of powder into a batch type reactor holding waste water containing heavy metals wherein treatment is carried out, and the removing agent having heavy metals adsorbed is separated by an operation such as aggregate precipitation, filtration or the like, a method wherein a modifier is added to the removing agent to form a paste which is used as an agent for fixing sludges, muddy wastes, etc. for preventing from dissolving out, by mixing the removing agent therewith, a method wherein the removing agent is granulated in an appropriate manner and the resulting granule is filled in a column, etc. can be mentioned.

The present invention will be further illustrated by way of the following examples which, however, are not intended to limit the scope of the present invention.

EXAMPLE 1

24.0 g (0.1 mol) of Tetramethylthiuramdisulfide and 57.4 g (0.2 mol in terms of monomer) of a 30% aqueous emulsion of polyvinyl acetate were introduced into a 500 ml capacity flask and heated under reflux with stirring for 10 hours. Thereafter the resulting reaction mixture was poured into 3.5 l of water to transfer unreacted polyvinyl acetate into the aqueous layer, followed by separating by filtration and drying insoluble matters to give 20.2 g of a white solid. For removing unreacted tetramethylthiuramdisulfide, the solid was immersed in benzene to remove benzene-soluble matters, whereby 8 g of a white solid resin was obtained. The positions and the qualitative intensities of the absorption bands of infrared spectra in the region of 2,000–700 cm$^{-1}$, of said resin were as follows:

| Position of[*1] absorption band (cm$^{-1}$) | Intensity[*2] | Reversion[*3] |
|---|---|---|
| 1735 | s. | PVAC |
| 1499 | s. | DMTC |
| 1381 | sh. | DMTC |
| 1360 | s. | PVAC |
| 1255 | m. | PVAC, DMTC |
| 1155 | m. | DMTC |
| 1100 | sh. | |
| 1050 | w. | DMTC |
| 1022 | w. | PVAC |
| 980 | sh. | |
| 970 | s. | DMTC |
| 890 | w. | |
| 880 | w. | |

[*1]According to KBr tablet method
[*2]s: strong, m: medium, w: weak, sh: shoulder
[*3]PVAC: Based on vinyl acetate portion DMTC: Based on (CH$_3$)$_2$NCSS- group From these results, this resin was identified with polyvinyl(dimethylthiocarbamoylthio)acetate. Further, it had a decomposition point of 190°–196° C.; was insoluble in benzene; and had a heavy metals-seizing performance[*4] of 0.3 ppb.

[*4] The heavy metals-seizing performance was determined as follows: 5 g of a resin is added to 200 ml of a solution of mercuric chloride (40 ppm in terms of Hg$^{2+}$ concentration); after stirring for 5 hours, the resulting mixture is subjected to separation by filtration with No. 5C filter paper; and the resulting filtrate is subjected to mercury analysis with a frameless atomic absorptiometer according to JIS K 0102 method to determine the concentration of mercury. The determination in the following Examples and Comparative examples were also carried out in this matter).

In addition, the tetramethylthiuramdisulfide employed in this Example 1 had a decomposition point of 210°–250° C.; was soluble in benzene; and had a heavy metals-seizing performance of 37.5 ppb. Further, the polyvinyl acetate employed in this Example 1 had a decomposition point of 220°–260° C.; was soluble in benzene; and had a heavy metals-seizing performance of 40 ppm.

EXAMPLE 2

29.6 g (0.1 mol) of tetraethylthiuramdisulfide and 57.4 g (0.2 mol in terms of monomer) of a 30% emulsion of polyvinyl acetate were introduced into a 500 ml flask and heated under reflux with stirring for 10 hours. Thereafter the resulting reaction mixture was poured into 3.5 l of water to transfer unreacted polyvinyl acetate into an aqueous layer, followed by separating by filtration and drying insoluble matters to give 21.5 g of a white solid. For removing unreacted tetraethylthiuramdisulfide, the solid was immersed in benzene to remove benzene-soluble matters, whereby 8.3 g of a white solid resin was obtained. The position and the qualitative intensity of the absorption bands of the infrared spectra in the region of 2,000–700 cm$^{-1}$, of said resin were as follows:

| Position of absorption band (cm$^{-1}$)[*1] | Intensity[*2] | Reversion[*3] |
|---|---|---|
| 1744 | br. vs. | PVAC |
| 1503 | s. | |
| 1455 | w. | |
| 1425 | s. | |
| 1385 | w. | DETC |
| 1362 | m. | DETC, PVAC |
| 1304 | sh. | DETC |
| 1282 | s. | DETC |
| 1244 | br. m. | PVAC |
| 1159 | m. | DETC |
| 1102 | w. | DETC |
| 1067 | m. | DETC |
| 1016 | vw. | PVAC |
| 1006 | vw. | DETC |
| 976 | m. | DETC |
| 923 | m. | DETC |
| 826 | s. | DETC |
| 800 | vw. | DETC |
| 782 | w. | DETC |

[*1]According to KBr tablet method
[*2]s: strong, me: medium, sh: shoulder, br: broad in width, v: very
[*3]PVAC: Based on vinyl acetate portion DETC: Based on (C$_2$H$_5$)$_2$NCSS- group From these results, this resin was identified with polyvinyl(diethylthiocarbamoylthio)acetate. Further it had a decomposition point of 191°–198° C.; was insoluble in benzene; and had a heavy metals-seizing performance of 0.4 ppb.

In addition, the tetraethylthiuramdisulfide employed in this Example 2 was soluble in benzene. Further the polyvinyl acetate employed in this Example 2 was the same as that employed in Example 1.

COMPARATIVE EXAMPLE 1

Examples 1 and 2 were repeated except that heating under reflux was not carried out. No polyvinyl(dialkylthiocarbamoylthio)acetate resin was obtained in these respective experiments.

COMPARATIVE EXAMPLE 2

24.0 g (0.1 mol) of tetramethylthiuramdisulfide and 57.4 g (0.2 mol in terms of monomer) of a 30% emulsion of polyvinyl acetate were introduced into a 500 ml flask and mixed at room temperature.

50 ml of Benzene was added to the resulting mixture, followed by stirring. Thereafter, an operation of taking out the resulting benzene layer was repeated three times, and benzene was removed from the benzene solution thus obtained, under reduced pressure at 30° C.

to give a mixture of tetramethylthiuramdisulfide with polyvinyl acetate, which was soluble in benzene and had a heavy metals-seizing performance of 39.2 ppb.

EXAMPLE 3

2.5 g of Polyvinyl(dimethylthiocarbamoylthio)acetate obtained in Example 1 and 2.5 g of a powder active carbon (trade name: Tsurumicoal PC) were mixed to give an agent for removing heavy metals, which was subjected to the mercury determination described in Example 1 to give a mercury concentration in the resulting filtrate, of 0.2 ppb or lower.

EXAMPLE 4

0.5 g of the agent for removing heavy metals, obtained in Example 3 was added to 100 ml of an aqueous solution of copper sulfate (10 ppm in terms of copper concentration), followed by stirring for 2 hours. Subsequent procedure was carried out in the same manner as in Example 3. The copper concentration of the resulting filtrate was 0.5 ppm or lower.

EXAMPLE 5

Example 4 was repeated except that an aqueous solution of potassium bichromate ($Cr^{6+}$ concentration: 10 ppm) was substituted for the aqueous solution of copper sulfate in Example 4. The chrome concentration of the resulting filtrate was 1.5 ppm.

COMPARATIVE EXAMPLE 3

Example 3 was repeated except that 5 g of active carbon alone was substituted for the agent for removing heavy metals, of Example 3. The mercury concentration of the resulting filtrate was 138 ppb.

COMPARATIVE EXAMPLE 4

Example 1 was repeated except that 2.5 g of tetramethylthiuramdisulfide and 2.5 g of powder active carbon were substituted for the agent for removing heavy metals, of Example 3. The mercury concentration of the resulting filtrate was 6.8 ppb.

What is claimed is:

1. An agent for removing heavy metals selected from the group consisting of Hg, Cu and Cr, which agent comprises a polyvinyl(dialkylthiocarbamoylthio)acetate resin which is a polymer having a unit expressed by the formula $$\begin{array}{c} R_1 \\ \phantom{R_1} \diagdown \\ \phantom{R_1} \phantom{\diagdown} N-\overset{\overset{\displaystyle S}{\|}}{C}-S-CH_2-\overset{\overset{\displaystyle O}{\|}}{C}-O \\ \phantom{R_1} \diagup \phantom{N-C-S-CH_2-C-O} | \\ R_2 \phantom{\diagup N-C-S-CH_2-C-O} \text{-}(CH-CH_2)\text{-} \end{array}$$

wherein $R_1$ and $R_2$ each represent hydrogen atom or an alkyl group of $C_1$-$C_5$ and is a reaction product of a vinyl acetate polymer with a tetraalkylthiuramdisulfide, said agent being insoluble in benzene and having the ability to remove metals selected from the group consisting of Hg, Cu and Cr from solutions containing the same.

2. An agent according to claim 1 wherein said tetraalkylthiuramdisulfide is tetraethylthiramdsulfide.

3. An agent for removing heavy metals according to claim 1 which contains as an auxiliary agent active carbon, bone charcoal or finely divided coal.

4. An agent for removing heavy metals according to claim 3 wherein said auxiliary agent is powdered active carbon.

5. An agent according to claim 1 wherein the mixing ratio of said auxiliary agent is in the range of 10:1–1:10.

6. An agent according to claim 2 wherein the mixing ratio of said auxiliary agent is in the range of 10:1–1:10.

7. An agent according to claim 3 wherein the mixing raio of said auxiliary agent is in the range of 10:1 to 1:10.

8. An agent according to claim 1 wherein said resin is prepared from a vinyl acetate polymer in the form of an emulsion or a methanol solution.

9. An agent according to claim 1 wherein said polymer is polyvinyl(dimethylthiocarbamoylthio)acetate and said tetraalkylthiuramdisulfide is tetramethylthiouramdisulfide.

10. An agent according to claim 1 wherein said polymer is polyvinyl(diethylthiocarbamoylthio)acetate.

* * * * *